Nov. 29, 1960   W. C. CROFT   2,962,582
COMBINED LIGHTING AND VENTILATING UNIT
Filed March 29, 1957   2 Sheets-Sheet 1

Inventor
WILLIAM C. CROFT
by Hill, Sherman, Meroni, Gross & Simpson   Attys.

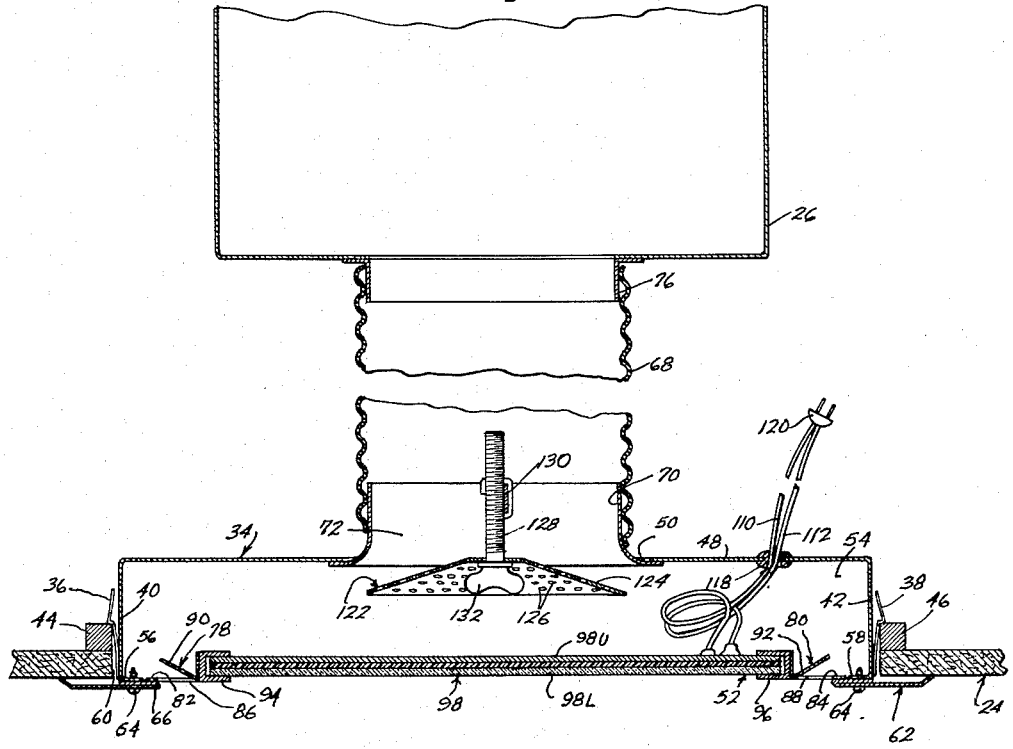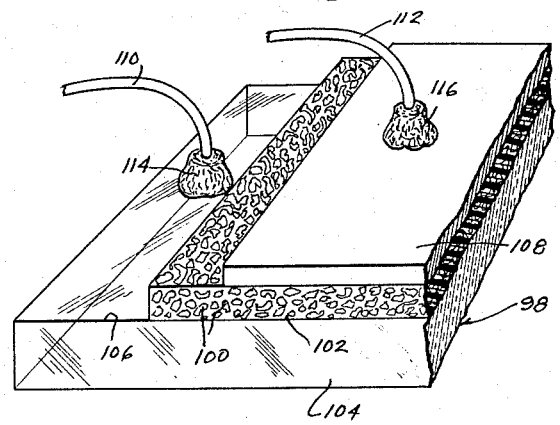

2,962,582

COMBINED LIGHTING AND VENTILATING UNIT

William C. Croft, Wilmette, Ill., assignor to The Pyle National Company, Chicago, Ill., a corporation of New Jersey Filed Mar. 29, 1957, Ser. No. 649,475

1 Claim. (Cl. 240—9)

The present invention relates generally to improvements in combination ventilating and illuminating apparatus, and particularly to an improved apparatus constituting a combined ventilating and illuminating unit utilizing an electroluminescent light source which also functions as a baffle and wall portion of a diffuser.

It is contemplated according to this invention to utilize a device for the production of light by electroluminescence. The term "electroluminescence" may be taken to pertain to apparatus and method wherein a direct transformation of electrical energy into visible radiation is obtained. Structures employing electroluminescent principles have numerous advantages in improved light distribution, and particularly in the efficient transformation of electrical energy into available light radiation.

A practical structure which is illustrative of the principles of electroluminescence and which may be combined in the combinations of the present invention, utilizes a film of phosphor dispersed in a dielectric and placed between two conducting plates. One of the plates will be a light transmitting plate in order for the light generated by the transformation of electrical energy to emerge. Such devices have also been referred to as luminous capacitors. Such an electroluminescent plate and plates of equivalent constructions can be arranged in a flat space conserving form adapted to producing a uniformly distributed soft light energy for lighting a room and which is extremely efficient in operation. The present invention contemplates utilization of an electroluminescent plate in an advantageous combination with an improved apparatus for ventilating and lighting a room or building space.

Accordingly, it is an object of the invention to provide a combination air and light distributor unit which will effectively ventilate and simultaneously effect the distribution of light rays in an area which is subjected to its influence.

Another object of the invention is to provide an improved ventilating and lighting apparatus which consumes a small amount of space, is light-weight and simple in construction for ease of manufacture and ease of installation and which is well adapted to being mounted in a flush ceiling or wall installation.

A further object of the invention is to provide a lighting and air distribution apparatus which may be concealed within a false wall or ceiling, and effectively distribute light and air while blending with the surface in which it is installed.

A further object of the invention is to provide a combined lighting and ventilating apparatus wherein an electroluminescent plate is employed and an improved supporting and operating mechanism is provided to contribute to and enhance the natural advantages of an air distribution system and electroluminescent light source.

Other objects, features and advantages will become more apparent with the teaching of the principles of the invention in connection with the disclosure of the preferred form thereof in the specification, claim and drawings, in which:

Figure 2 is an enlarged vertical sectional view taken through a combined ventilating and lighting fixture; and, Figure 3 is an enlarged perspective view of a portion of an electroluminescent plate of the type employed and with portions broken away to illustrate the construction of the plate.

Figure 1:
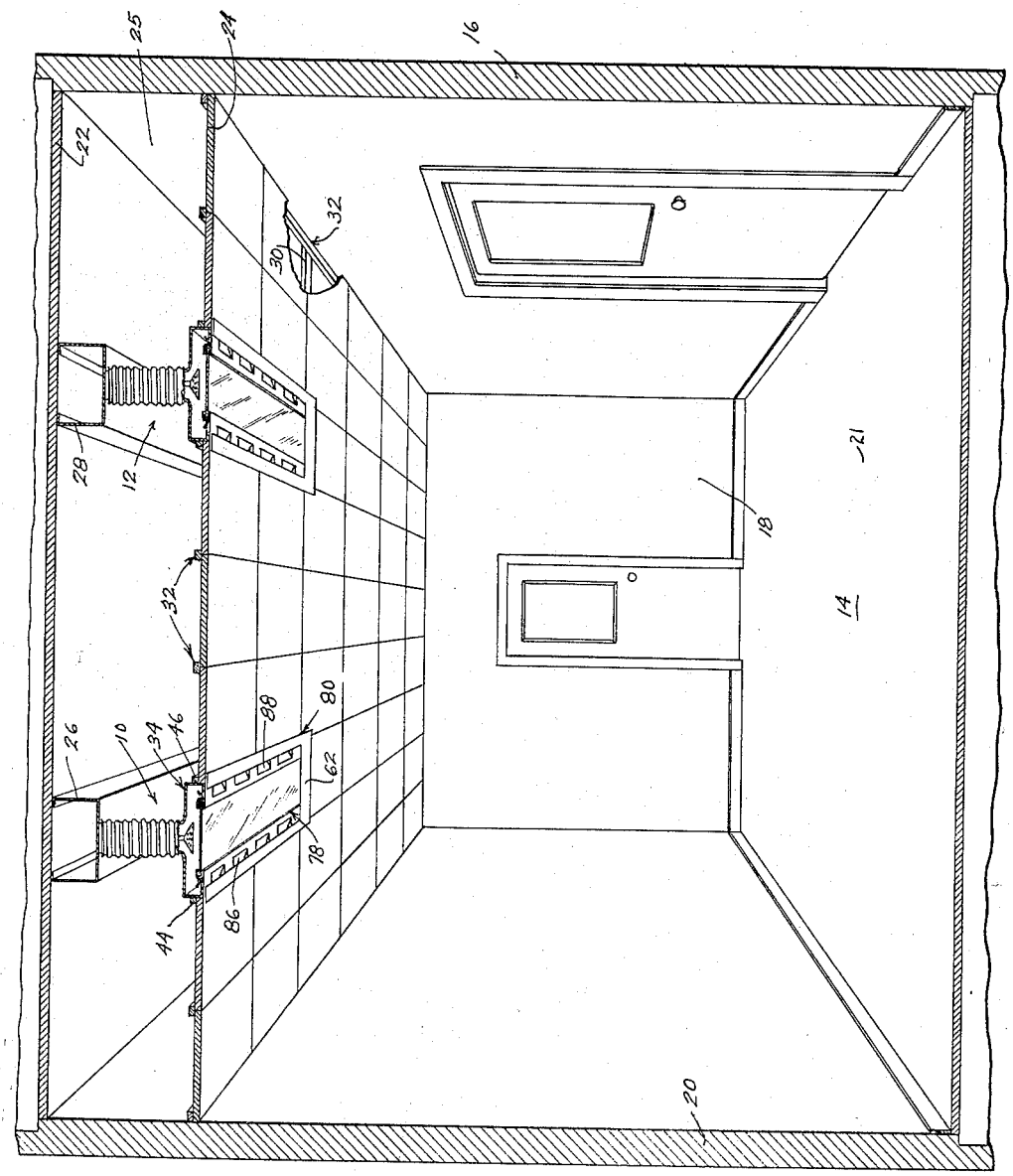
Figure 1 is a perspective view of a room and a combined lighting and ventilating unit embodying the principles of the invention, shown with a vertical section taken through the room and the fixtures employed in operating position therein.

While the features of the invention are specifically illustrated wherein the elements are combined in a preferred embodiment and shown in an environment wherein their features find specific advantage, it is to be understood that the features may be employed in other arrangements.

In the drawings, with reference to Figure 1, the invention is shown embodied in combined lighting and ventilating fixtures 10 and 12, which are utilized to light and ventilate the space within a room 14. The room is illustrated as forming a part of a building with walls 16, 18 and 20, and a floor 21. A ceiling is shown at 22. Positioned below the true ceiling 22 and spaced therefrom, is a false ceiling 24, which improves the appearance of the room and is functional in that it hides constructional elements which may be exposed on the true ceiling 22. The false ceiling 24 may be formed of acoustical material or the like and its construction will be explained later.

As a part of the ventilating system of the building or the room, air ventilating ducts 26 and 28 are provided secured to the ceiling 22. These ducts and the less attractive parts of the fixtures 10 and 12 are hidden by the false ceiling 24. For supporting the false ceiling, lateral supporting strips, such as shown at 30, are secured to the walls 16 and 20 and extend across the room. These strips 30 carry ceiling supporting runners 32, which may be spaced as desired and are shown spaced in order that the sides of the tiles which form the false ceiling 24, may be secured thereto for suspending the individual tiles.

The lighting and ventilating units 10 and 12 each constitute a combined air and light diffuser unit 34. Since the units 10 and 12 are identical in construction, only the details of construction of one of the air and light diffuser units 34 need be described and reference should be made to the structural details shown in Figure 2.

For supporting end of the light and ventilating units 34, spring anchor clips 36 and 38 are secured to means forming side walls 40 and 42 of the unit 34. The unit 34 may be of a width so that it may fit between the ceiling supporting runners 44 and 46 and the spring anchor clips 36 and 38 lock over the top of the runners to support the unit 34 and its associated elements. Thus, a plurality of units 34 may be strategically spaced throughout the extent of the false ceiling to effect the desired pattern of air and light distribution. The air and light diffuser unit 34 may be advantageously formed of sheet metal or any other suitable material to prescribe the confines of a space or chamber having an upper wall 48 and which is characterized by one or more inlets formed by openings 50.

The side walls 40 and 42 and the end walls 54 depend from the upper wall 48 and are provided with inwardly extending flanges as at 56 and 58 to support a diffusion means 52 provided in accordance with the invention.

In the embodiment shown the unit 34 is adapted for mounting substantially flush with the ceiling 24. To form a more finished installation and for covering the edges of the ceiling material, which form an opening 60 into which the unit 34 is inserted, a rectangular shaped decorative or escutcheon ring 62 is provided. This ring may be painted to match the color of the ceiling or may be chrome plated for a decorative effect. The ring may be attached to the unit 34 in a suitable manner, such as by a plurality of screws 64, projecting through openings in the escutcheon ring and threaded into holes in the flanges 56 and 58. The inner edge 66 of the escutcheon ring 62 projects inwardly over the open lower face of the plenum chamber 34 beyond the flanges 56 and 58 to provide additional support for the diffusion means 52.

Ventilating air for the room space is received by the air and light diffuser unit 34 from the main duct 26 concealed in a space 25 behind the ceiling 24. For connecting these elements, a flexible tube or conduit 68 is provided connecting between the duct 26 and the unit 34. For connecting the unit 34 with the tube 68, an annular flange or connecting member 70 projects through the inlet or opening 50 and forms an air receiving passage 72. The tube 68 slides over the flange 70 and may be suitably secured thereto, such as by cement.

Similarly, the duct 26 carries a downwardly projecting connector flange 76 and the upper end of the tube 68 is connected to this connector flange 76. The flexible tube 68, of course, accommodates misalignments which may occur between the outlet openings in the duct 26 and the inlet openings 50 in the units 34. Thus, air at increased pressure is supplied from the duct 26 to a plenum or plenum chamber formed within the combined air and light diffuser unit 34.

For distributing the light and ventilating air downwardly from the plenum chamber, the diffuser assembly 52 includes means forming air outlet openings and includes a pair of laterally extending air distributing and plate supporting strips 78 and 80. These strips rest at their outer edges 82 and 84 on the flanges 56, 58. The strips are formed of sheet metal or the like and have a plurality of air distributing slots 86 and 88 therein. These slots are formed by ears or tabs 90 and 92 struck inwardly or upwardly from the strips to form the slots. The struck ears 92 and 90 not only form the openings, but provide air guide members for directing the air downwardly into the room at an angle to the surface of the ceiling.

The strips 78 and 80 have U-shaped electroluminescent light plate holders 94 and 96 secured along their inner edges. These U-shaped holders 94 and 96 carry an electroluminescent light plate 98 which spans the gap and closes the opening between the strips 78 and 80. The electroluminescent light plate 98 is a flat substantially rectangular member having appreciable longitudinal and lateral extent and being of relatively small thickness compared to the over all planar area thereof. Thus, the plate 98 provides a lower surface 98L which is presented to the interior of the space being ventilated and lighted and an upper surface 98U which forms a baffle surface in spaced register with the air passage 72 formed in the upper wall 48 of the unit 34.

As illustrated in Figures 2 and 3, the electroluminescent light plate 98 illustrates an embodiment of such apparatus which operate to directly convert the electrical energy into luminescent energy. As an example of operation, these devices apply an electrical potential to a crystalline phosphor or the suspension of such a crystal within a semi-conducting solid to cause the crystal to create light.

In the form illustrated in the drawings, micro-crystalline grains of phosphor 100 are embedded in a sheet of thermoplastic dielectric material 102, which is of the order of a few thousandths of an inch thick. This mixture is placed, such as by spraying, on a piece of plate glass 104, which has been provided with a transparent conducting surface 106 on its upper side. This assembly is backed on its top by a sheet of aluminum foil 108 or a coat of conducting silver paste. Electrical leads 110 and 112 are suitably connected, such as by a bonding connector 114 and 116 to the conducting surface 106 on the upper side of the light conductive glass 104, and to the conducting aluminum foil 108 to supply electricity for operation of the device. The entire electroluminescent plate assembly is supported in the lighting and ventilating unit by the U-shaped brackets 94 and 96, and the electrical leads 110 and 112 lead out through an opening having a sealing grommet 118 in the top 48 of the plenum chamber. A plug 120 or like means, suitably connects the leads 110 and 112 to a source of electricity for operation of the light plate 98.

Thus, the diffusion means 52 includes at its center portion the flat thin light plate 98 which extends across the base of the plenum chamber and provides a source of light which radiates and diffuses light downwardly in the space between the slots 86 and 88 through which air is diffused downwardly into the room.

The ventilating air, which enters the diffuser unit 34 as at the passage 72 is directed laterally across the top surface 98U of the light plate 98 thereby effecting a reduction in pressure and velocity. The air is further diffused outwardly through the slots 86 and 88 which distribute the air downwardly. To control the flow of air into the plenum chamber 34 and to insure even distribution therein, a volume control means such as a valve head 122 is provided. This valve 122 cooperated with a seat provided by the member 70 in the air receiving opening 72 to regulate the air flow into the plenum chamber. The upper surface 124 of the valve head is conical in shape and the head has a plurality of evenly distributed orifices 126 extending therethrough to cause an even distribution of air beneath the valve head. The remainder of the air flows evenly over the upper conical surface 124 to all areas of the plenum chamber.

The valve head 122 is supported for adjustment by a threaded supporting bolt 128. The bolt is adjustably threaded into a supporting bracket 130 carried by the connector 70. The adjusting and supporting bolt 128 has a winged head 132 for adjustably regulating the height of the valve head 122 in the air flow opening.

The diffuser assembly 52, which contains the air distribution openings 86 and 88, and which supports the electroluminescent light plate 98, is constructed to be removable from the open bottom of the plenum chamber and the electrical leads 110 and 112 are arranged to provide sufficient length for dropping the plate in order that the operator may reach the winged head 132 of the valve adjusting bolt 128. In this manner, the operator can adjust the vertical height of the valve head 122 to control the flow of air diffused through any particular air and light diffuser unit 34.

Thus, it will be seen that I have provided an improved lighting and ventilating device which meets the objectives and advantages hereinbefore set forth. The construction is shallow and compact, and it will be observed that it can be manufactured of very lightweight material enabling ease of handling. The parts are easily removed for replacement, and the construction makes it expressly simple for the operator to temporarily remove the light plate for adjusting the air flow valve.

The assembly can be installed in a short period of time in existing false ceilings or wall constructions which are hollow, or the entire ceiling assembly can be installed and assembled and supported on the same supporting structure. A plurality of units can be installed in a ceiling in a pattern arrangement or in an arrangement to direct air and light to a locale of activity and occupancy.

I have, in the drawings and specification, presented a detailed disclosure of the preferred embodiment of my invention, but it is to be understood that I do not intend to limit the invention to the specific form disclosed but intend to cover all modifications, changes and alternative constructions and methods falling within the scope of the principles taught by my invention.

I claim as my invention:

In combination with a ceiling of a space to be ventilated and illuminated, a false ceiling spaced below said ceiling and having an opening formed therein, a supply duct extending into the space above said false ceiling, a combination lighting-ventilating unit comprising an inverted generally trough-shaped housing mounted in said opening of said false ceiling and extending upwardly above the level of said false ceiling into the space above said false ceiling, flexible tubular passage means interconnecting said supply duct and said housing to supply ventilating air from said duct to said housing, and a plate form closure member extending across the bottom of said housing and forming a finished generally planar surface at said opening in said false ceiling, said plate form closure member together with said housing forming a plenum chamber in said opening, said plate form closure member including an electroluminescent light plate of the type comprising a film of phosphor dispersed in a dielectric and placed between two conducting plates to form a luminous capacitor, circuit means for energizing said luminous capacitor, thereby to emit light rays therefrom, and said plate form closure member having air flow diffusion passages formed therein and extending therethrough to diffuse air from said plenum chamber outwardly into the space and simultaneously with the emission of light rays therefrom.

References Cited in the file of this patent

UNITED STATES PATENTS

| | | |
|---|---|---|
| 2,564,334 | Kennedy | Aug. 14, 1951 |
| 2,566,349 | Mager | Sept. 4, 1951 |
| 2,775,927 | Wulle | Jan. 1, 1957 |
| 2,845,855 | Burns | Aug. 5, 1958 |

FOREIGN PATENTS

| | | |
|---|---|---|
| 652,914 | Germany | Nov. 11, 1937 |

OTHER REFERENCES

Electroluminescence—A New Method of Producing Light, by Elmer C. Payne, Eric L. Mager, and Charles W. Jerome, pp. 688–693 of Illuminating Engineer, November 1950.